US009460883B2

(12) United States Patent
Yoshikawa

(10) Patent No.: US 9,460,883 B2
(45) Date of Patent: Oct. 4, 2016

(54) TEMPERATURE FUSE AND SLIDING ELECTRODE USED FOR TEMPERATURE FUSE

(71) Applicant: NEC SCHOTT Components Corporation, Koka-shi, Shiga (JP)

(72) Inventor: Tokihiro Yoshikawa, Koka (JP)

(73) Assignee: NEC SCHOTT Components Corporation, Koka-shi (JP)

( * ) Notice: Subject to any disclaimer, the term of this patent is extended or adjusted under 35 U.S.C. 154(b) by 225 days.

(21) Appl. No.: 14/357,932

(22) PCT Filed: Nov. 19, 2012

(86) PCT No.: PCT/JP2012/079939

§ 371 (c)(1),
(2) Date: May 13, 2014

(87) PCT Pub. No.: WO2013/077286

PCT Pub. Date: May 30, 2013

(65) Prior Publication Data

US 2014/0306794 A1 Oct. 16, 2014

(30) Foreign Application Priority Data

Nov. 22, 2011 (JP) ................................ 2011-254687

(51) Int. Cl.
*H01H 85/36* (2006.01)
*H01H 37/76* (2006.01)
(Continued)

(52) U.S. Cl.
CPC ............ *H01H 85/36* (2013.01); *H01H 1/025* (2013.01); *H01H 1/04* (2013.01); *H01H 37/765* (2013.01); *H01H 1/36* (2013.01)

(58) Field of Classification Search
CPC .... H01H 37/765; H01H 85/36; H01H 1/025; H01H 1/04; H01H 1/36
USPC ........................................................ 337/148
See application file for complete search history.

(56) References Cited

U.S. PATENT DOCUMENTS 3,576,415 A * 4/1971 Gwyn, Jr. ................ H01H 1/08 200/266
4,281,307 A * 7/1981 Hara ...................... H01H 37/36 337/114

(Continued)

FOREIGN PATENT DOCUMENTS

CN 1300442 A 6/2001
CN 1823176 8/2006

(Continued)

OTHER PUBLICATIONS

Chinese Office Action, dated Sep. 6, 2015, in Chinese Patent Application No. 201280057303.6, 8 pages, with English Translation 9 pages.

(Continued)

*Primary Examiner* — Anatoly Vortman
(74) *Attorney, Agent, or Firm* — W. F. Fasse

(57) ABSTRACT

A temperature fuse includes a cylindrical metal case, a sliding electrode slidable over an inner surface of the metal case, and a terminal electrically connected to the metal case while the sliding electrode is in contact therewith, during activation, the sliding electrode moving away from the terminal so that electrical connection between the metal case and the terminal is cut off, the sliding electrode being formed by working a thin metal plate, the sliding electrode including at least a base material layer composed of copper or a copper alloy and a first surface layer composed of silver or a silver alloy, and a site of contact with the terminal being the first surface layer having a thickness not smaller than 5 μm.

15 Claims, 3 Drawing Sheets

(51) Int. Cl.

| | |
|---|---|
| ***H01H 1/025*** | (2006.01) |
| ***H01H 1/04*** | (2006.01) |
| *H01H 1/36* | (2006.01) |

(56) References Cited

U.S. PATENT DOCUMENTS

| | | | | |
|---|---|---|---|---|
| 4,286,248 | A * | 8/1981 | Hara | H01H 37/765 337/403 |
| 4,450,204 | A * | 5/1984 | Kim | H01H 1/0231 200/265 |
| 4,503,131 | A * | 3/1985 | Baudrand | H01B 1/026 200/266 |
| 5,139,890 | A * | 8/1992 | Cowie | H01H 1/023 200/267 |
| 5,530,417 | A | 6/1996 | Hohider | |
| 6,414,285 | B1 | 7/2002 | Takeda | |
| 6,724,292 | B2 * | 4/2004 | Miyashita | C22C 5/06 29/623 |
| 7,323,965 | B2 * | 1/2008 | Yoshikawa | H01H 37/765 337/159 |
| 7,323,966 | B2 | 1/2008 | Yoshikawa | |
| 7,330,098 | B2 | 2/2008 | Yoshikawa | |
| 7,362,208 | B2 * | 4/2008 | Yoshikawa | H01H 37/765 337/388 |
| 7,589,290 | B2 * | 9/2009 | Rehbein | H01R 13/035 174/126.1 |
| 7,843,307 | B2 * | 11/2010 | Yoshikawa | H01H 37/765 337/298 |
| 2003/0112117 | A1 | 6/2003 | Miyashita et al. | |
| 2006/0239854 | A1 | 10/2006 | Uenishi et al. | |
| 2011/0285497 | A1 * | 11/2011 | Yen | H01H 37/765 337/326 |
| 2012/0061705 | A1 * | 3/2012 | Toscano | B23K 1/0012 257/98 |

FOREIGN PATENT DOCUMENTS

| | | | |
|---|---|---|---|
| JP | 01-313832 | A | 12/1989 |
| JP | 02-005844 | U | 1/1990 |
| JP | 05-047252 | A | 2/1993 |
| JP | 08-045404 | A | 2/1996 |
| JP | 3161636 | U | 7/2010 |
| WO | WO 03/009323 | | 1/2003 |
| WO | WO 2005/007907 | | 1/2005 |

OTHER PUBLICATIONS

PCT International Search Report of the International Searching Authority for International Application PCT/JP2012/079939, mailed Jan. 15, 2013, 2 pages, Japanese Patent Office.

PCT International Preliminary Report on Patentability including English Translation of PCT Written Opinion of the International Searching Authority for International Application PCT/JP2012/079939, issued May 27, 2014, 5 pages, International Bureau of WIPO, Geneva, Switzerland.

Chinese Office Action in Chinese Patent Application No. 201280057303.6, mailed May 17, 2016, 8 pages, with English translation, 9 pages.

* cited by examiner (a) (b)

TEMPERATURE FUSE AND SLIDING ELECTRODE USED FOR TEMPERATURE FUSE

TECHNICAL FIELD

The present invention relates to a temperature fuse and a sliding electrode used for the temperature fuse.

BACKGROUND ART

A temperature fuse has conventionally been used for protection against overheat damage of domestic or industrial electronic and electric devices. A temperature fuse has been used in various household electrical appliances, portable devices, communication devices, office equipment, car-mounted devices, AC adapters, chargers, motors, batteries, and other electronics as protection components for promptly disconnecting a circuit in case of abnormal overheat. In general, a temperature fuse has a wide nominal rated current approximately from 0.5 A to 15 A, however, in particular for a high current not lower than 6 A, a temperature-sensitive pellet type temperature fuse which has a contact, senses an abnormal temperature, and causes the contact to perform an opening operation is suitably made use of.

Temperature-sensitive pellet type temperature fuses in a variety of forms in terms of details are available, and for example, a temperature-sensitive pellet type temperature fuse described in WO2003/009323 (PTD 1) or Japanese Patent Laying-Open No. H08-045404 (PTD 2) is in such a form that a metal case, a pair of leads, an insulating material, two springs which are tightly and weakly compressed, a sliding electrode, and a temperature-sensitive material are provided as main components and the sliding electrode is movable while it is in contact with an inner surface of a conductive metal case. The weakly compressed spring is provided between the sliding electrode and the insulating material and the tightly compressed spring is provided between the sliding electrode and the temperature-sensitive material. In a normal state, these compressed springs are both in a compressed state, and the tightly compressed spring is stronger than the weakly compressed spring. Therefore, the sliding electrode is biased toward the insulating material and in contact with one lead, such that the sliding electrode can be rendered conductive. Therefore, as this lead is connected to a wire of an electronic device or the like, a current passes from the lead through the sliding electrode to the metal case and then to another lead.

An organic substance, or a thermosoluble substance or a thermoplastic substance such as a thermoplastic resin, can be employed for the temperature-sensitive material. When a prescribed operating temperature is reached, the temperature-sensitive material is molten or softened and deforms under a load from the compressed spring. Therefore, when an electronic device or the like to which the temperature fuse is connected is overheated and the prescribed operating temperature is reached, the temperature-sensitive material deforms, the tightly compressed spring is unloaded, and the weakly compressed spring is released from the compressed state in response to extension of the tightly compressed spring and extends. Thus, the sliding electrode moves while it is in contact with the inner surface of the metal case away from the lead, and passage of the current is cut off. By connecting the temperature-sensitive pellet type temperature fuse having such a function to a wire of an electronic device or the like, breakage of a main body of a device, fire, or the like due to abnormal overheat of the device can be prevented in advance.

As a sliding electrode used in the temperature-sensitive pellet type temperature fuse, for example, a sliding electrode obtained by rolling a metal material in a thin plate shape and working by press-forming the plate is generally employed. For a sliding electrode used in the conventional temperature-sensitive pellet type temperature fuse, a single material composed exclusively of silver or a silver alloy alone has been used for the necessity of prevention of welding of a contact due to an arc caused during an operation of moving away from a lead. However, it has not been economical, because a relatively large amount of silver representing a noble metal is consumed.

Japanese Utility Model No. 3161636 (PTD 3) proposes such a construction that a sliding electrode made of a copper material is coated with extremely thin silver plating. The coating with extremely thin silver plating, however, tends to be broken by an arc or the like caused during an operation of moving away, and in this case, a surface of the copper material is exposed to cause welding of a contact. Therefore, welding of the contact could not sufficiently be prevented. If a contact is welded, a current is not disconnected and a function as a temperature fuse is not achieved. In addition, plating is poor in adhesiveness to a base, and there has been a problem of peel-off or the like.

CITATION LIST

Patent Document

PTD 1: WO2003/009323
PTD 2: Japanese Patent Laying-Open No. H08-045404
PTD 3: Japanese Utility Model No. 3161636

SUMMARY OF INVENTION

Technical Problem

An object of an embodiment of the present invention is to provide a temperature fuse including a sliding electrode with a surface layer having high adhesiveness to a base, in which welding of a contact is less likely, and to provide such a sliding electrode, while an amount of use of silver is reduced.

Solution To Problem

The present invention relates to a temperature fuse including a cylindrical metal case, a sliding electrode slidable over an inner surface of the metal case, and a terminal electrically connected to the metal case while the sliding electrode is in contact, during activation, the sliding electrode moving away from the terminal so that electrical connection between the metal case and the terminal is cut off, the sliding electrode being formed by working a thin metal plate and including at least a base material layer composed of copper or a copper alloy and a first surface layer composed of silver or a silver alloy, and a site of contact with the terminal being the first surface layer having a thickness not smaller than 5 μm.

The first surface layer can be formed, for example, of the silver alloy containing one or more elements selected from the group consisting of copper, nickel, tin, indium, cadmium, and zinc. In addition, the first surface layer can be formed of an oxide of silver or the silver alloy. The first surface layer can be stacked on a surface of the base material layer through plating or cladding.

The base material layer is preferably formed of copper or the copper alloy having conductivity not lower than 30% IACS. It is noted that IACS refers to the International Annealed Copper Standard internationally adopted as the standard for electrical resistance when conductivity of a copper material is considered, and conductivity of copper having volume resistivity of $1.7241\times10^{-2}$ μΩm under the International Annealed Copper Standard is defined as 100% IACS. In addition, the base material layer is preferably formed of copper or the copper alloy having tensile strength not lower than 500 $N/mm^2$.

The sliding electrode may have a nickel layer between the base material layer and the first surface. In addition, the sliding electrode may have a second surface layer composed of silver or a silver alloy, which is stacked on a side of the base material layer opposite to a side of the first surface layer.

Furthermore, the present invention relates to a sliding electrode used in a temperature fuse including a cylindrical metal case, the sliding electrode slidable over an inner surface of the metal case, and a terminal electrically connected to the metal case while the sliding electrode is in contact, during activation, the sliding electrode moving away from the terminal so that electrical connection between the metal case and the terminal is cut off, the sliding electrode being formed by working a thin metal plate and including at least a base material layer composed of copper or a copper alloy and a first surface layer composed of silver or a silver alloy, and a site of contact with the terminal being the first surface layer having a thickness not smaller than 5 μm.

Advantageous Effects of Invention

According to the temperature fuse in the present invention, a temperature fuse excellent in characteristics, in which welding is less likely even though an arc is caused at a contact when a sliding electrode moves away from a terminal, can be provided.

DESCRIPTION OF EMBODIMENTS

The present invention is directed to a temperature fuse including a cylindrical metal case, a sliding electrode slidable over an inner surface of the metal case, and a terminal electrically connected to the metal case while the sliding electrode is in contact, during activation, the sliding electrode moving away from the terminal so that electrical connection between the metal case and the terminal is cut off. The temperature fuse according to the present invention will be described below with reference to the drawings.

Temperature Fuse

Figure 1:
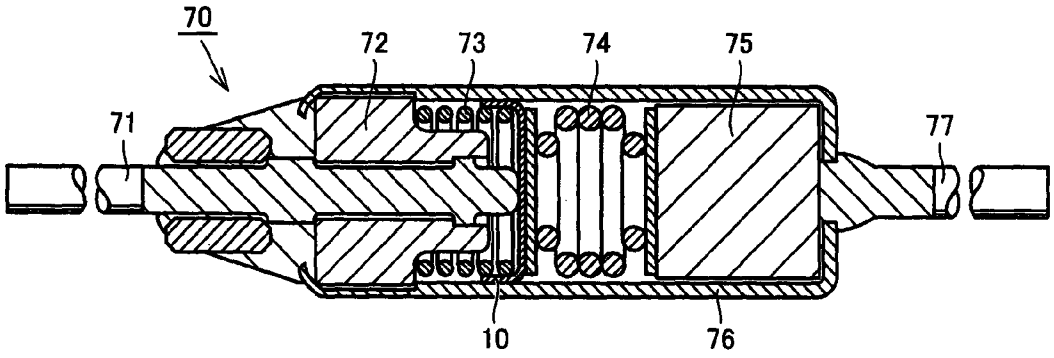
FIG. 1 is a cross-sectional view showing a schematic construction of a temperature fuse in one embodiment of the present invention.

FIG. 1 is a cross-sectional view showing a schematic construction of a temperature fuse 70 in one embodiment of the present invention. As shown in FIG. 1, temperature fuse 70 is constituted of a cylindrical metal case 76, a sliding electrode 10, a first lead (terminal) 71, a second lead 77, an insulating material 72, a tightly compressed spring 74, a weakly compressed spring 73, and a temperature-sensitive material 75 as main components. Sliding electrode 10 is provided to be slidable over an inner surface of conductive metal case 76. Weakly compressed spring 73 is provided between sliding electrode 10 and insulating material 72 and tightly compressed spring 74 is provided between sliding electrode 10 and temperature-sensitive material 75.

In a normal state, each of weakly compressed spring 73 and tightly compressed spring 74 is in a compressed state. Since force applied in a direction of extension is stronger in tightly compressed spring 74 than in weakly compressed spring 73, sliding electrode 10 is biased toward insulating material 72 and press-contacted with first lead 71. Therefore, as first lead 71 and second lead 77 are connected to a wire of an electronic device or the like, a current flows successively from first lead 71 through sliding electrode 10 and metal case 76 to second lead 77.

For example, an organic substance such as adipic acid having a melting point of 150° C. can be employed for temperature-sensitive material 75. When a prescribed operating temperature is reached, temperature-sensitive material 75 is softened or molten and deforms under a load from tightly compressed spring 74. Therefore, when an electronic device or the like to which the temperature fuse is connected is overheated and the prescribed operating temperature is reached, temperature-sensitive material 75 deforms, tightly compressed spring 74 is unloaded, and the compressed state of weakly compressed spring 73 is released in response to extension of tightly compressed spring 74. As weakly compressed spring 73 extends, sliding electrode 10 and first lead 71 are spaced apart from each other and the current flow is cut off. By connecting the temperature fuse having such a function to a wire of an electronic device or the like, breakage of a main body of a device, fire, or the like due to abnormal overheat of the device can be prevented in advance.

In the temperature fuse, in a case that a temperature of a device to which the temperature fuse is connected abruptly increases, temperature-sensitive material 75 is quickly softened and molten and deforms. Therefore, first lead 71 and sliding electrode 10 are quickly spaced apart from each other. On the other hand, in a case that a temperature slowly increases, temperature-sensitive material 75 is slowly softened and molten and deforms. Therefore, first lead 71 and sliding electrode 10 are spaced apart from each other also slowly. Consequently, a locally low arc is likely to be caused between first lead 71 and sliding electrode 10. In the temperature fuse according to the present invention, even though an arc is caused, occurrence of welding between first lead 71 and sliding electrode 10 can be suppressed by employing sliding electrode 10 which will be described in detail subsequently.

Figure 2:
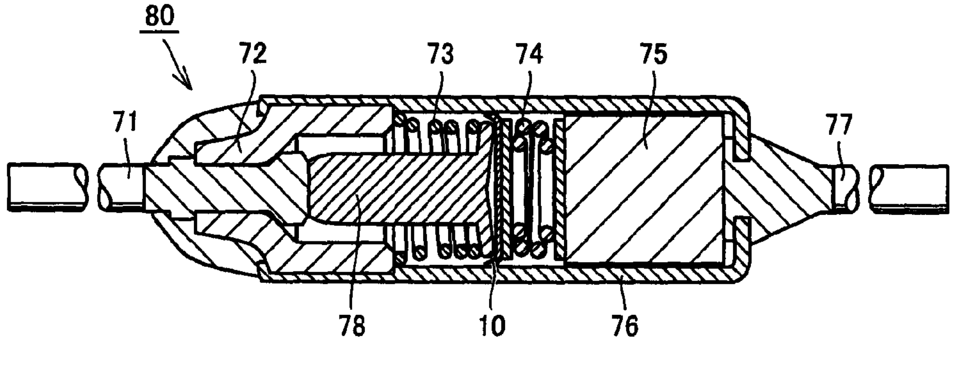
FIG. 2 is a cross-sectional view showing a schematic construction of a temperature fuse in another embodiment of the present invention.

FIG. 2 is a cross-sectional view showing a schematic construction of a temperature fuse 80 in another embodiment of the present invention. Temperature fuse 80 shown in FIG. 2 is different from temperature fuse 70 shown in FIG. 1 only in such a construction that a relay electrode (terminal) 78 is connected to an end portion of first lead 71 and sliding electrode 10 is in contact with relay electrode 78. Since other features and operation mechanisms are common to those of temperature fuse 70 shown in FIG. 1, description will not be provided.

Sliding Electrode

First Embodiment

Figure 3:
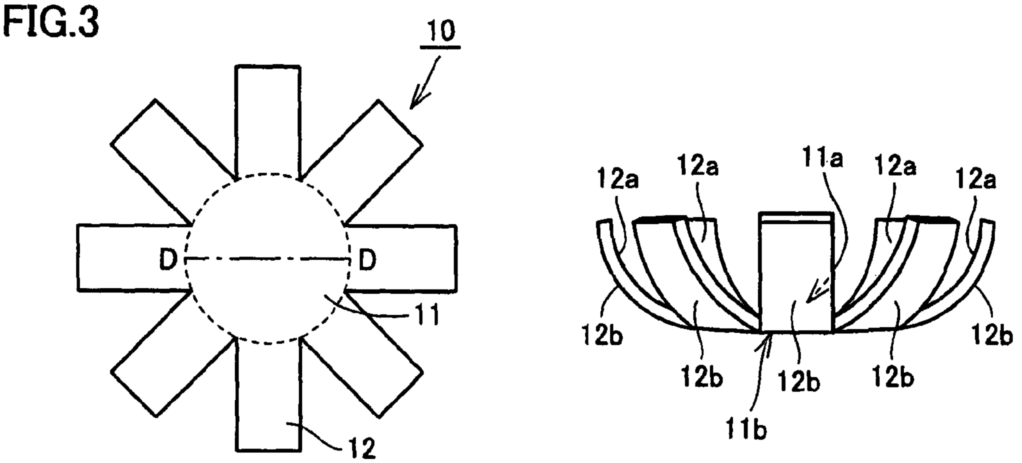
FIG. 3 is a top view (a) and a side view (b) showing a sliding electrode in a first embodiment.

FIG. 3 (*a*) is a top view showing sliding electrode 10 in a first embodiment and FIG. 3 (*b*) is a side view thereof. Sliding electrode 10 has an annular central region 11 and a plurality of tab portions 12 extending outward from central region 11, and tab portion 12 is in a curved shape with its surface 12*a* facing inward. Sliding electrode 10 is arranged in the temperature fuse such that an outer surface 12*b* of tab portion 12 is in contact with the inner surface of the metal case and an inner surface 11*a* of central region 11 is in contact with the terminal.

Sliding electrode 10 is formed by working a thin metal plate. Sliding electrode 10 includes a base material layer composed of copper or a copper alloy and a first surface layer composed of silver or a silver alloy, and a site of contact with the terminal, that is, inner surface 11*a* of central region 11, is the first surface layer. Though a method of working a thin metal plate is not particularly limited, for example, cutting, pressing, drawing, and the like can be combined as appropriate. Sliding electrode 10 may be formed by working a thin metal plate in which the base material layer and the first surface layer are stacked, or by working a thin metal plate formed from the base material layer and thereafter stacking the first surface layer. Though a method of stacking the first surface layer on the base material layer is not limited, a plating method, a method using cladding, a method based on combination thereof, or the like is exemplified. In this case, a thin film layer of silver and a layer formed of a tape material of a silver alloy are combined to form the first surface layer.

A shape of sliding electrode 10 is not limited to the shape shown in FIG. 3 so long as the shape is such that sliding electrode 10 is slidable within the metal case in the temperature fuse and the terminal and the metal case can electrically be connected to each other while the sliding electrode is in contact with the terminal. For example, the number of tab portions 12 is not limited to eight shown in FIG. 3, and tab portions 12 may be integrated instead of separation into a plurality of portions.

Figure 4:
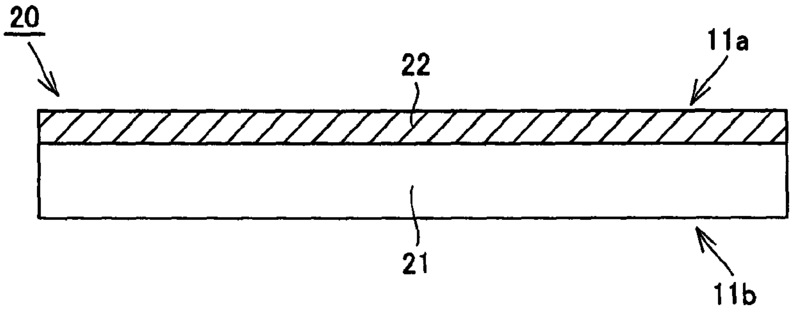
FIG. 4 is a diagram showing a stack construction of the sliding electrode in the first embodiment.

FIG. 4 shows a stack construction 20 of central region 11 of sliding electrode 10 shown in FIG. 3 (*a*) (a cross-sectional view along D-D). In stack construction 20, inner surface 11*a* of central region 11 is formed from first surface layer 22 and base material layer 21 is stacked on an outer side of first surface layer 22. Though not shown, tab portion 12 also has a stack structure similarly to central region 11.

Base material layer 21 is composed of copper or a copper alloy. Copper or a copper alloy having conductivity not lower than IACS 30% is preferably used for base material layer 21. By using a material having such conductivity, power loss in sliding electrode 10 can be decreased. In addition, copper or a copper alloy having tensile strength not lower than 500 $N/mm^2$ is preferably used for base material layer 21. By using such a copper alloy having elasticity, the sliding electrode can have moderate spring characteristics so as to ensure electrical connection of a contact surface with the metal case, and a contact pressure between the sliding electrode and the metal case can be increased to thereby lower contact resistance. Thus, internal resistance of the temperature fuse can be lowered to thereby decrease power loss. For example, titanium copper, beryllium copper, a Corson Series copper alloy representing a precipitation strengthening copper alloy containing nickel, silicon, or the like, and the like can suitably be used as the copper alloy. OLIN C7035 (trademark) manufactured by Dowa Metaltech Co., Ltd. (a Cu—Ni—Co—Si Corson Series copper alloy, conductivity: 45% IACS, having tensile strength of 800 $N/mm^2$) is exemplified as a specific example.

First surface layer 22 is composed of silver or a silver alloy. First surface layer 22 has a thickness in central region 11, that is, a site of contact with the terminal in sliding electrode 10, not smaller than 5 μm and preferably not smaller than 10 μm. When first surface layer 22 has a thickness smaller than 5 μm, sliding electrode 10 is not sufficiently protected in case of occurrence of an arc, and for example, base material layer 21 may be exposed and eluted. In addition, first surface layer 22 preferably has a thickness in central region 11 not greater than 50 μm. When a thickness of first surface layer 22 exceeds 50 μm, an amount of use of silver or a silver alloy increases, which is not preferred. A thickness of the entire sliding electrode is preferably not greater than 100 μm and more preferably from 60 to 90 μm. A thickness of each layer can be adjusted to a target thickness by rolling.

It is noted that first surface layer 22 may be constructed from a single layer or from multiple layers. With multiple layers, performance of protection of sliding electrode 10 by first surface layer 22 can further be improved. A silver alloy containing one or more elements selected from the group consisting of copper, nickel, indium, tin, cadmium, and zinc can be selected as a silver alloy used for first surface layer 22, and more preferably, a metal oxide may be adopted in order to enhance protection performance.

Second Embodiment

Figure 5:
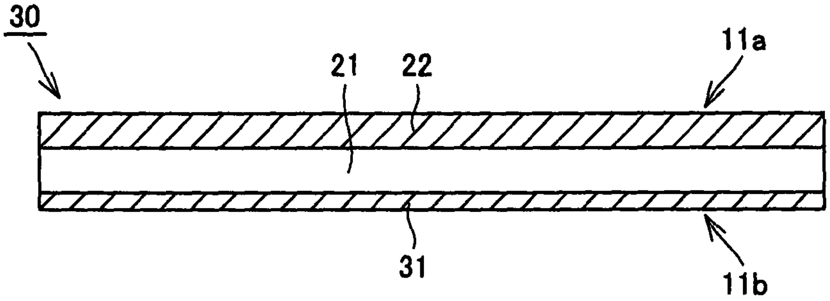
FIG. 5 is a diagram showing a stack construction of a sliding electrode in a second embodiment.

A sliding electrode in a second embodiment has a similar construction except for difference in stack construction from the sliding electrode in the first embodiment. FIG. 5 shows a cross-sectional view of the central region of the sliding electrode in the second embodiment. A stack construction 30 shown in FIG. 5 has base material layer 21 and first surface layer 22 as in the first embodiment, and further has a second surface layer 31 stacked on a side of base material layer 21 opposite to first surface layer 22. Second surface layer 31 is preferably a layer composed of silver or a silver alloy. Second surface layer 31 has performance of protection of the sliding electrode, similarly to first surface layer 22. Though a material similar to those exemplified for first surface layer 22 can be used for silver or a silver alloy, it does not have to be the same as a material for first surface layer 22.

In addition, since second surface layer 31 is not a layer in contact with a terminal like first surface layer 22, it can sufficiently exhibit protection performance even though it is formed to be smaller in thickness than first surface layer 22.

Third Embodiment

Figure 6:
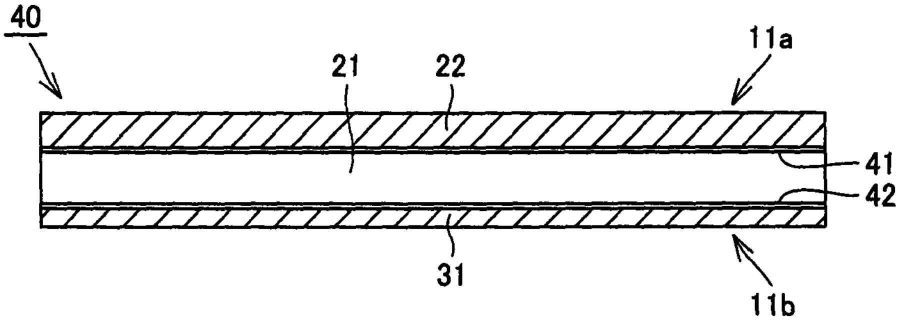
FIG. 6 is a diagram showing a stack construction of a sliding electrode in a third embodiment.

A sliding electrode in a third embodiment has a similar construction except for difference in stack construction from the sliding electrode in the second embodiment. FIG. 6 shows a cross-sectional view of the central region of the sliding electrode in the third embodiment. A stack construction 40 shown in FIG. 6 has such a construction that first surface layer 22 and second surface layer 31 are stacked on opposing surfaces of base material layer 21 respectively as in the second embodiment and it is constructed such that nickel layers 41 and 42 are provided between base material layer 21 and first surface layer 22 and between base material layer 21 and second surface layer 31, respectively. Nickel layers 41, 42 can prevent diffusion of copper from base material layer 31. Nickel layers 41, 42 can be formed with such a method as electrolytic plating, electroless plating, and cladding. The nickel layer can have a thickness, for example, from 0.1 to 0.5 μm.

EXAMPLES

Though the present invention will be described hereinafter in further detail with reference to Examples, the present invention is not limited thereto.

Example 1

A temperature fuse as in the third embodiment was fabricated. Initially, a sliding electrode was fabricated as follows. A nickel layer having a thickness of 0.1 μm was formed with electrolytic plating on opposing surfaces of a base material composed of a Corson copper alloy and having a thickness of 58 μm, a silver layer having a thickness of 1 μm was formed with plating on respective surfaces of nickel layers, and a silver alloy layer of a thickness of 20 μm made of a material containing 85 mass % of AgCuO representing a silver alloy oxide was formed with cladding on a surface of one silver layer (a surface on a side in contact with the terminal), to thereby fabricate a thin metal plate. A total thickness of the thin metal plate was 80.2 μm. In succession, such a thin metal plate was pressed to fabricate the sliding electrode in a shape shown in FIG. 3. A thickness of each layer in the sliding electrode was the same as a thickness of each layer in the thin metal plate. A stack structure constituted of the silver alloy layer of a thickness of 20 μm and the silver layer of a thickness of 1 μm corresponds to first surface layer 22 in FIG. 6 and the silver layer of a thickness of 1 μm corresponds to second surface layer 31 in FIG. 6.

Then, a temperature-sensitive material composed of adipic acid and having a melting point of 150° C. and the sliding electrode fabricated above were mounted on the temperature fuse having the structure shown in FIG. 1, to thereby obtain the temperature fuse in Example 1.

Example 2

A temperature fuse as in the second embodiment was fabricated. Initially, a sliding electrode was fabricated as follows. A silver alloy layer of a thickness of 20 μm made of a material containing 85 mass % of AgCuO representing a silver alloy oxide prepared in advance was formed with cladding on one surface of a base material composed of copper and having a thickness of 59 μm (a surface on a side in contact with the terminal) and a silver layer having a thickness of 1 μm was formed with plating on the other surface, to thereby fabricate a thin metal plate. A total thickness of the thin metal plate was 80 μm. In succession, such a thin metal plate was pressed to fabricate the sliding electrode in a shape shown in FIG. 3. A thickness of each layer in the sliding electrode was the same as a thickness of each layer in the thin metal plate. The silver alloy layer of a thickness of 20 μm corresponds to first surface layer 22 in FIG. 5 and the silver layer of a thickness of 1 μm corresponds to second surface layer 31 in FIG. 5.

Then, a temperature-sensitive material composed of adipic acid and having a melting point of 150° C. and the sliding electrode fabricated above were mounted on the temperature fuse having the structure shown in FIG. 1, to thereby obtain the temperature fuse in Example 2.

Example 3

A temperature fuse as in the second embodiment was fabricated. Initially, a sliding electrode was fabricated as follows. A silver alloy layer of a thickness of 10 μm made of a material containing 85 mass % of AgCuO representing a silver alloy oxide prepared in advance was formed with cladding on opposing surfaces of a base material composed of copper and having a thickness of 50 μm (a surface on a side in contact with the terminal), to thereby fabricate a thin metal plate. A total thickness of the thin metal plate was 70 μm. In succession, such a thin metal plate was pressed to fabricate the sliding electrode in a shape shown in FIG. 3. A thickness of each layer in the sliding electrode was the same as a thickness of each layer in the thin metal plate. The silver alloy layer of a thickness of 10 μm corresponds to first surface layer 22 in FIG. 5 and the silver alloy layer of a thickness of 10 μm corresponds to second surface layer 31 in FIG. 5.

Then, a temperature-sensitive material composed of adipic acid and having a melting point of 150° C. and the sliding electrode fabricated above were mounted on the temperature fuse having the structure shown in FIG. 1, to thereby obtain the temperature fuse in Example 3.

Example 4

A temperature fuse as in the second embodiment was fabricated. Initially, a sliding electrode was fabricated as follows. A silver alloy layer of a thickness of 5 μm made of a material containing 85 mass % of AgCuO representing a silver alloy oxide prepared in advance was formed with cladding on one surface of a base material composed of copper and having a thickness of 64 μm (a surface on a side in contact with the terminal) and a silver layer having a thickness of 1 μm was formed with plating on the other surface, to thereby fabricate a thin metal plate. A total thickness of the thin metal plate was 70 μm. In succession, such a thin metal plate was pressed to fabricate the sliding electrode in a shape shown in FIG. 3. A thickness of each layer in the sliding electrode was the same as a thickness of each layer in the thin metal plate. The silver alloy layer of a thickness of 5 μm corresponds to first surface layer 22 in FIG. 5 and the silver layer of a thickness of 1 μm corresponds to second surface layer 31 in FIG. 5.

Then, a temperature-sensitive material composed of adipic acid and having a melting point of 150° C. and the sliding electrode fabricated above were mounted on the temperature fuse having the structure shown in FIG. 1, to thereby obtain the temperature fuse in Example 4.

Comparative Example 1

A temperature fuse as in the second embodiment except for difference in thickness of the first surface layer was fabricated. Initially, a sliding electrode was fabricated as follows. A silver layer of a thickness of 0.1 μm was formed with plating on opposing surfaces of a base material composed of copper and having a thickness of 80 μm, to thereby fabricate a thin metal plate. A total thickness of the thin metal plate was 80.2 μm. In succession, such a thin metal plate was pressed to fabricate the sliding electrode in a shape shown in FIG. 3. A thickness of each layer in the sliding electrode was the same as a thickness of each layer in the thin metal plate.

Then, a temperature-sensitive material composed of adipic acid and having a melting point of 150° C. and the sliding electrode fabricated above were mounted on the temperature fuse having the structure shown in FIG. 1, to thereby obtain the temperature fuse in Comparative Example 1.

Comparative Example 2

In Comparative Example 2, a thin metal plate composed of silver and having a thickness of 80 μm was pressed to fabricate the sliding electrode in a shape shown in FIG. 3. Then, a temperature-sensitive material composed of adipic acid and having a melting point of 150° C. and the sliding electrode fabricated above were mounted on the temperature fuse having the structure shown in FIG. 1, to thereby obtain the temperature fuse in Comparative Example 2.

Comparative Example 3

In Comparative Example 3, a thin metal plate of a thickness of 80 μm composed of a material containing 85 mass % of AgCuO representing a silver alloy oxide was pressed to fabricate the sliding electrode in a shape shown in FIG. 3. Then, a temperature-sensitive material composed of adipic acid and having a melting point of 150° C. and the sliding electrode fabricated above were mounted on the temperature fuse having the structure shown in FIG. 1, to thereby obtain the temperature fuse in Comparative Example 3.

Measurement of Resistance Value

One hundred temperature fuses were prepared according to each of Examples 1 to 4 and Comparative Examples 1 to 3, a resistance value was measured, and an average value of measurement values of 100 temperature fuses was adopted as a resistance value. Table 1 shows results.

Overload Test

Whether or not the temperature fuses according to Examples 1 to 4 and Comparative Examples 1 to 3 normally operated was checked when they were forced to operate as they were placed in a constant temperature bath, power was fed with a voltage being set to AC 300 V and a current being set to 15 A, and a temperature in the constant temperature bath was increased at a constant rate (1° C./minute) (overload test). A case that the fuse operated with a temperature of a surface of a main body of the temperature fuse being not higher than 157° C. (power feed was cut off) was defined as a normal operation, and a case that the fuse did not operate even with a temperature of a main body of the temperature fuse exceeding 157° C. was defined as an abnormal operation. Whether or not 10 temperature fuses according to each of Examples 1 to 4 and Comparative Examples 1 to 3 normally operated was checked. Table 1 shows the number of temperature fuses which normally operated.

TABLE 1

| | Layered Construction of Sliding Electrode (Thickness of Each Layer) | Resistance Value [mΩ] (Average Value of 100) | Overload Test (The Number of Normally Operated Temperature Fuses/The Number of Tested Temperature Fuses) |
|---|---|---|---|
| Example 1 | AgCuO/Ag/Ni/Corson Alloy/Ni/Ag (20 μm/1 μm/0.1 μm/58 μm/0.1 μm/1 μm) | 0.81 | 10/10 |
| Example 2 | AgCuO/Cu/Ag (20 μm/59 μm/1 μm) | 0.83 | 10/10 |
| Example 3 | AgCuO/Cu/AgCuO (10 μm/50 μm/10 μm) | 0.83 | 10/10 |
| Example 4 | AgCuO/Cu/Ag (5 μm/64 μm/1 μm) | 0.82 | 10/10 |
| Comparative Example 1 | Ag/Cu/Ag (0.1 μm/80 μm/0.1 μm) | 0.80 | 7/10 |
| Comparative Example 2 | Ag (80 μm) | 0.78 | 10/10 |
| Comparative Example 3 | AgCuO (80 μm) | 0.81 | 10/10 |

As can be seen in Table 1, the temperature fuses according to Examples 1 to 4 obtained sufficiently low internal resistance values comparable to those of the temperature fuses according to Comparative Examples 2, 3 while they achieved significant reduction in an amount of use of silver as compared with the temperature fuses according to Comparative Examples 2, 3, all the temperature fuses normally operated, and temperature fuses excellent in characteristics were obtained. On the other hand, regarding the temperature fuses according to Comparative Example 1, three of ten temperature fuses tested in the overload test did not normally operate. After the test, the temperature fuses which did not normally operate were disassembled for investigation. Then, welding of the contact was found in all of them. The temperature fuses according to Comparative Example 1 have a thickness of the silver layer of 0.1 μm and do not satisfy a thickness not smaller than 5 μm, which is a condition of thickness of the first surface layer.

INDUSTRIAL APPLICABILITY

The present invention can be made use of for a contact opening type temperature fuse for a high current which has a sliding electrode, senses an abnormal temperature, and causes a contact to perform an opening operation, and particularly suitably for a temperature-sensitive pellet type temperature fuse.

REFERENCE SIGNS LIST

10 sliding electrode; 11 central region; 12 tab portion; 20, 30, 40 stack construction; 21 base material layer; 22 first surface layer; 31 second surface layer; 41, 42 nickel layer; 70, 80 temperature fuse; 71 lead (terminal); 72 insulating material; 73 weakly compressed spring; 74 tightly compressed spring; 75 temperature-sensitive material; 76 metal case; 77 lead; and 78 relay electrode (terminal).

The invention claimed is:

1. A temperature fuse, comprising:

a cylindrical metal case;

a sliding electrode slidable over an inner surface of said metal case; and a terminal electrically connected to said metal case while said sliding electrode is in contact with said terminal, during activation, said sliding electrode moving away from said terminal so that electrical connection between said metal case and said terminal is cut off, said sliding electrode being formed by working a thin metal plate and including at least a base material layer composed of copper or a copper alloy having conductivity not lower than 30% IACS, and a first surface layer composed of a silver alloy or an oxide of a silver alloy, and a site of contact with said terminal being said first surface layer having a thickness not smaller than 5 μm and not greater than 50 μm.

2. The temperature fuse according to claim 1, wherein said first surface layer is composed of the silver alloy containing one or more elements selected from the group consisting of copper, nickel, tin, indium, cadmium, and zinc.

3. The temperature fuse according to claim 1, wherein said first surface layer is composed of the oxide of the silver alloy.

4. The temperature fuse according to claim 1, wherein said first surface layer is stacked on a surface of said base material layer through cladding.

5. The temperature fuse according to claim 1, wherein said base material layer is composed of copper or the copper alloy having tensile strength not lower than 500 $N/mm^2$.

6. The temperature fuse according to claim 1, wherein said sliding electrode further includes a nickel layer between said base material layer and said first surface layer.

7. The temperature fuse according to claim 1, wherein said sliding electrode further includes a second surface layer composed of silver or a silver alloy, which is stacked on a side of said base material layer opposite to a side of said first surface layer.

8. The temperature fuse according to claim 7, further comprising an underlayer of silver disposed between said base material layer and said first surface layer, and wherein said second surface layer consists of the silver.

9. The temperature fuse according to claim 7, wherein said second surface layer has a thickness different from the thickness of said first surface layer.

10. The temperature fuse according to claim 7, wherein said second surface layer has a thickness less than the thickness of said first surface layer.

11. The temperature fuse according to claim 7, wherein said first surface layer consists of the silver alloy, and said second surface layer consists of the silver.

12. The temperature fuse according to claim 1, wherein the thickness of said first surface layer at said site of contact is at least 21 μm.

13. The temperature fuse according to claim 1, further comprising an underlayer of silver disposed between said base material layer and said first surface layer.

14. The temperature fuse according to claim 1, wherein said base material layer consists of the copper alloy having the conductivity not lower than 30% IACS.

15. A sliding electrode used in a temperature fuse including a cylindrical metal case, the sliding electrode slidable over an inner surface of said metal case, and a terminal electrically connected to said metal case while said sliding electrode is in contact with said terminal, during activation, said sliding electrode moving away from said terminal so that electrical connection between said metal case and said terminal is cut off, said sliding electrode being formed by working a thin metal plate and comprising at least a base material layer composed of copper or a copper alloy having conductivity not lower than 30% IACS, and a first surface layer composed of a silver alloy or an oxide of a silver alloy, and a site of contact with said terminal being said first surface layer having a thickness not smaller than 5 μm and not greater than 50 μm.

* * * * *